Patented Sept. 27, 1949

2,483,382

UNITED STATES PATENT OFFICE 2,483,382

NEW PENICILLIN SALT

Moses Wolf Goldberg, Upper Montclair, and Sidney Teitel, Nutley, N. J., assignors to Hoffmann-La Roche Inc., Nutley, N. J., a corporation of New Jersey No Drawing. Application March 9, 1948,
Serial No. 13,954

3 Claims. (Cl. 260—302)

1

The present invention relates to a new salt of penicillin and its method of preparation. By "penicillin" we mean each of the several antibiotic substances of the penicillin series, for example, penicillin F, penicillin dihydro F, penicillin G, penicillin K and penicillin X, or their mixtures, produced by the growth of a penicillin forming micro-organism, for example, *Penicillium notatum* or *Penicillium chrysogenum*, in a nutrient medium, and each of said substances produced by any other means.

More particularly our invention relates to the new 1 - methyl-3(2,6,6-trimethyl-1-cyclohexen-1-yl)-propylamine salt of penicillin which can be represented by the following formula:

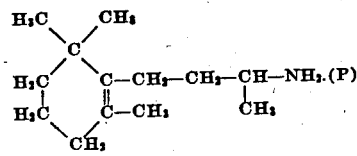

where (P) stands for penicillin, such as, for example, penicillin G, K or any of the other known penicillins. The new salt can form solvates, such as the hydrates.

The 1 - methyl - 3 - (2,6,6-trimethyl-1-cyclohexen-1-yl-propylamine salt of penicillin can be readily obtained, for example, by adding equimolecular amounts or a slight excess of 1-methyl - 3 - (2,6,6-trimethyl-1-cyclohexen-1-yl) - propylamine to a solution of penicillin in form of the free acid in an organic medium, for example, in ether or butylacetate, or the like. The salt crystallizes out and can be filtered off. In view of the low solubility of the new salt in water, it can also be expediently prepared by simply mixing in an aqueous medium, preferably equimolecular amounts of a water-soluble penicillin salt, for example, the triethylamine salt of penicillin G, or an alkali or alkali earth metal salt of penicillin, such as sodium penicillin G, calcium penicillin, or any other salt of penicillin which is more soluble in water than the 1-methyl-3-(2,6,6 - trimethyl-1-cyclohexen-1-yl) - propylamine salt of penicillin, and an acid addition salt of 1-methyl-3-(2,6,6-trimethyl-1-cyclohexen-1-yl)-propylamine as, for example, its hydrochloride. The 1 - methyl - 3 - (2,6,6-trimethyl-1-cyclohexen-1-yl)-propylamine salt of penicillin is thus also directly obtained in crystalline form and can be filtered off.

Because of its low solubility in water and in most of the organic solvents generally used for the extraction of penicillin, such as butylacetate,

2 amyl acetate, ether, chloroform, and the like, the new salt of Formula A provides an excellent means for isolating penicillin in pure form from solutions containing impure penicillin. Thus, for example, by treating a crude butylacetate extract of penicillin, containing penicillin in only about 30 per cent purity with 1-methyl-3-(2,6,6 - trimethyl - 1 - cyclohexen-1-yl) - propylamine, the penicillin salt of this amine is directly isolated in high yields. If the impure penicillin contains a large percentage of penicillin G, the crystalline salt obtained is the practically pure penicillin G salt of 1-methyl-3-(2,6,6-trimethyl - 1 - cyclohexen-1-yl)-propylamine. The new penicillin salt can also be isolated from aqueous solutions containing impure penicillin by treatment of such solutions with 1-methyl-3-(2,6,6 - trimethyl - 1 - cyclohexen-1-yl)-propylamine or an acid addition salt of it, such as the hydrochloride.

The 1 - methyl - 3 - (2,6,6-trimethyl-1-cyclohexen-1-yl)-propylamine salt of penicillin, in particular the corresponding penicillin G salt, is practically insoluble in water and in fatty oils. Suspensions of this salt in such vehicles provide a new and very useful dosage form of penicillin, which is characterized by an unusually long-lasting therapeutic effect. The penicillin is very slowly released from this insoluble salt, and it is thus possible to maintain therapeutic blood levels over a much longer time than is attainable with a water-soluble penicillin salt in aqueous solution or in suspensions in oil or in oil and beeswax. Thus, for example, the intramuscular injection of 50 mg. of the new salt per kg. bodyweight produced demonstrable blood levels in rabbits for periods up to seven days. The 1-methyl - 3 - (2,6,6 - trimethyl-1-cyclohexen-1-yl)-propylamine salt of penicillin is also characterized by its very low toxicity (LD 50: more than 2.5 grams per kg. in mice) and its high stability. No activity loss was observed after eight weeks' storage at 50° C.

The following examples will serve to illustrate the preparation of the new 1-methyl-3-(2,6,6-trimethyl-1-cyclohexen-1-yl)-propylamine salt of penicillin.

EXAMPLE 1

*From crystalline sodium penicillin G*

To 383 mg. of crystalline sodium penicillin G dissolved in 10 ml. of water were added 30 ml. of an aqueous solution containing 220 mg. of 1-methyl-3-(2,6,6-trimethyl-1-cyclohexen-1-yl) - propylamine hydrochloride. A crystalline precipitate formed immediately. The reaction mixture, after storage at 2° C. for one hour was filtered. The crystals were washed with two 5 ml. portions of water and dried over phosphorus pentoxide to constant weight. Yield: 560 mg. (95 per cent of theory). The crystalline 1-methyl-3-(2,6,6-trimethyl-1-cyclohexen-1-yl)-propylamine salt of penicillin G thus obtained melted at 131–133° C. with decomposition. The penicillin assay against *Staphylococcus aureus* was about 1100 units per mg. (calculated value 1090 units per mg.) and the solubility in water at 26° C. about 0.03 per cent. The same salt can also be obtained if calcium penicillin G, potassium penicillin G, or the triethylamine salt of penicillin G is employed instead of the sodium penicillin G. It contains one mol of water of crystallization.

Instead of the hydrochloride of 1-methyl-3-(2,6,6 - trimethyl - 1 - cyclohexen-1-yl) - propylamine, other acid addition salts of said amine or the free base can also be employed to form the same penicillin salt.

EXAMPLE 2

*From pure penicillin G in form of the free acid*

2.2 grams of 1-methyl-3-(2,6,6-trimethyl-1-cyclohexen-1-yl)-propylamine were added all at once at room temperature to 80 ml. of a moist ether solution containing 3.33 grams of pure penicillin G in form of the free acid. The precipitate that formed immediately was filtered off after storage of the reaction mixture at 4° C. for three hours, and was recrystallized from acetonitrile. The crystalline 1-methyl-3-(2,6,6-trimethyl-1-cyclohexen-1-yl) - propylamine salt of penicillin G thus obtained melted at 132–134° C. with decomposition and assayed 1080 units per mg. against *Staphylococcus aureus*.

EXAMPLE 3

*From crude penicillin extract*

To 500 ml. of an anhydrous butylacetate extract of crude penicillin (similar aliquots yielded 48 grams of calcium penicillin with a *Staphylococcus aureus* value of 300 units per mg.) were added 40 grams of 1-methyl-3-(2,6,6-trimethyl-1-cyclohexen-1-yl)-propylamine. To the clear solution were added 4 cc. of water, whereupon crystals began to deposit immediately. After 24 hours at 2° C., the crystals were filtered off, washed with butylacetate, then ether and dried in vacuo. Thus was obtained 13 grams of the crystalline 1-methyl-3-(2,6,6-trimethyl-1-cyclohexen-1-yl)-propylamine salt of penicillin G melting at 131–134° C. with decomposition and a *Staphylococcus aureus* value of 1120 units per mg.

EXAMPLE 4

*1-Methyl-3-(2,6,6-trimethyl-1-cyclohexen-1-yl)-propylamine salt of penicillin K*

To 383 mg. of sodium penicillin K dissolved in 10 ml. of water were added 30 ml. of an aqueous solution containing 220 mg. of 1-methyl-3-(2,6,6-trimethyl-1-cyclohexen-1-yl) - propylamine hydrochloride. The crystals that formed immediately were filtered off, washed with water and dried over phosphorus pentoxide to constant weight yielding 460 mg. The crystalline penicillin K salt melted at 96–102° C. and had a *Staphylococcus aureus* value of 1360 units per mg. The solubility in water at 26° C. was about 0.02 per cent. It contained half a mol of water of crystallization.

The 1-methyl-3-(2,6,6-trimethyl-1-cyclohexen-1-yl)-propylamine is a new compound. It can be represented by the following formula:

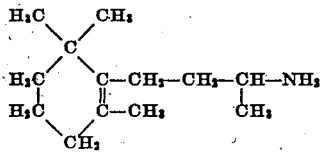

The compound forms the subject of our application Serial No. 13,953, filed March 9, 1948, and can be prepared in the following manner:

Four hundred grams of β-ionone, dissolved in 900 cc. of a 17 per cent solution of ammonia in methanol, are catalytically hydrogenated in the presence of about 30 grams of Raney nickel at 150° C. and 2,000 pounds per square inch hydrogen pressure for about 24 hours. The catalyst is then filtered off and the methanol solution concentrated. The residual liquid is fractionated by vacuum distillation at 5 mm. mercury pressure. A yield of at least 335 grams of 1-methyl-3-(2,6,6-trimethyl-1-cyclohexen - 1 - yl) - propylamine is thus obtained. The boiling point of the new amine is 106–108° C. at 5 mm. and 125–126° C. at 18 mm. The crystalline hydrochloride, which can be obtained by neutralizing the free base with hydrochloric acid, melts with decomposition at 225–227° C. It can be recrystallized from water.

The 1-methyl-3-(2,6,6-trimethyl-1-cyclohexen-1-yl)-propylamine can also be obtained by the catalytic hydrogenation of dihydro-β-ionone in ammoniacal methanol in the presence of Raney nickel under the same conditions employed for its preparations from β-ionone.

We claim:

1. A compound selected from the group consisting of 1-methyl-3-(2,6,6-trimethyl-1-cyclohexen-1-yl)-propylamine salts of penicillin and the hydrates thereof.

2. A compound according to claim 1 in which the penicillin is penicillin G.

3. A compound according to claim 1 in which the penicillin is penicillin K.

MOSES WOLF GOLDBERG.
SIDNEY TEITEL.

REFERENCES CITED

The following references are of record in the file of this patent:

British Report CMR–Br–234, CPS–687, pages 1, 2, 3 and 4, Feb. 12, 1946.

Certificate of Correction

Patent No. 2,483,382 September 27, 1949

MOSES WOLF GOLDBERG ET AL.

It is hereby certified that errors appear in the printed specification of the above numbered patent requiring correction as follows:

Column 1, line 13, for "methyl-3(2," read *methyl-3-(2,*; line 19, in front of the formula insert (A); line 28, after "1-yl" insert a closing parenthesis;

and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*